US009909854B2

(12) United States Patent
Yoshibayashi et al.

(10) Patent No.: US 9,909,854 B2
(45) Date of Patent: Mar. 6, 2018

(54) IMAGE PROCESSING APPARATUS AND IMAGE PROCESSING METHOD

(71) Applicant: CANON KABUSHIKI KAISHA, Tokyo (JP)

(72) Inventors: Hiroshi Yoshibayashi, Wakayama (JP); Yasufumi Takama, Kawasaki (JP); Takaaki Endo, Urayasu (JP); Ryo Ishikawa, Kawasaki (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 14/472,801

(22) Filed: Aug. 29, 2014

(65) Prior Publication Data
US 2015/0070469 A1 Mar. 12, 2015

(30) Foreign Application Priority Data

Sep. 6, 2013 (JP) ................. 2013-185700
Aug. 25, 2014 (JP) ................. 2014-170901

(51) Int. Cl.
H04N 13/02 (2006.01)
G01B 11/00 (2006.01)
G06T 7/00 (2017.01)
H04N 7/18 (2006.01)
G06T 19/00 (2011.01)

(52) U.S. Cl.
CPC .......... G01B 11/002 (2013.01); G06T 7/0012 (2013.01); G06T 19/00 (2013.01); H04N 7/18 (2013.01); G06T 2207/30096 (2013.01); G06T 2210/41 (2013.01); G06T 2219/008 (2013.01); G06T 2219/028 (2013.01)

(58) Field of Classification Search
CPC ..... G01B 11/002; G06T 19/00; G06T 7/0012; G06T 2219/008; G06T 2210/41; G06T 2219/028; G06T 2207/30096; H04N 7/18
USPC .......................................... 348/46
See application file for complete search history.

(56) References Cited

U.S. PATENT DOCUMENTS

| 6,792,370 | B2 | 9/2004 | Satoh et al. |
| 6,993,450 | B2 | 1/2006 | Takemoto et al. |
| 7,092,109 | B2 | 8/2006 | Satoh et al. |
| 7,130,754 | B2 | 10/2006 | Satoh et al. |
| 7,446,768 | B2 | 11/2008 | Satoh et al. |
| 7,519,218 | B2 | 4/2009 | Takemoto et al. |
| 8,350,897 | B2 | 1/2013 | Endo et al. |
| 8,730,234 | B2 | 5/2014 | Iizuka et al. |

(Continued)

FOREIGN PATENT DOCUMENTS

| JP | 3871747 B2 | 1/2007 |
| WO | 2011/074207 A1 | 6/2011 |

OTHER PUBLICATIONS

Nov. 25, 2015 Extended European Search Report in counterpart European Application No. 14183510.8.

Primary Examiner — Jared Walker
(74) Attorney, Agent, or Firm — Fitzpatrick, Cella, Harper & Scinto

(57) ABSTRACT

A plurality of cross section images which can be included in the range of a specific error occurring when specifying a correspondence cross section in a three-dimensional medical image of an object corresponding to a cross section of interest of the object are acquired from the three-dimensional medical image. The acquired cross section images are displayed on a display screen.

22 Claims, 8 Drawing Sheets

(56) References Cited

U.S. PATENT DOCUMENTS

| | | | |
|---|---|---|---|
| 2009/0087059 A1* | 4/2009 | Moriya | G06T 7/0038 |
| | | | 382/131 |
| 2010/0002928 A1 | 1/2010 | Durgan | |
| 2010/0191100 A1* | 7/2010 | Anderson | A61B 5/055 |
| | | | 600/424 |
| 2011/0150310 A1* | 6/2011 | Endo | G06T 7/0012 |
| | | | 382/131 |
| 2011/0268336 A1* | 11/2011 | Dmitrieva | G06T 7/0014 |
| | | | 382/131 |
| 2012/0256950 A1* | 10/2012 | Masuda | G06F 19/3418 |
| | | | 345/629 |
| 2012/0310092 A1 | 12/2012 | Yawata | |

* cited by examiner

F I G. 5
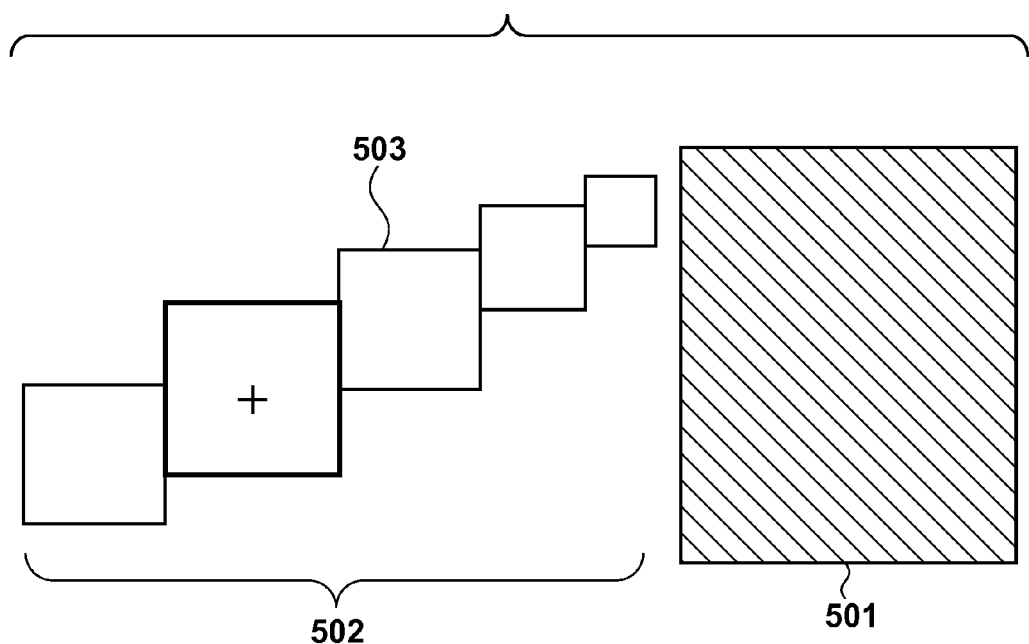

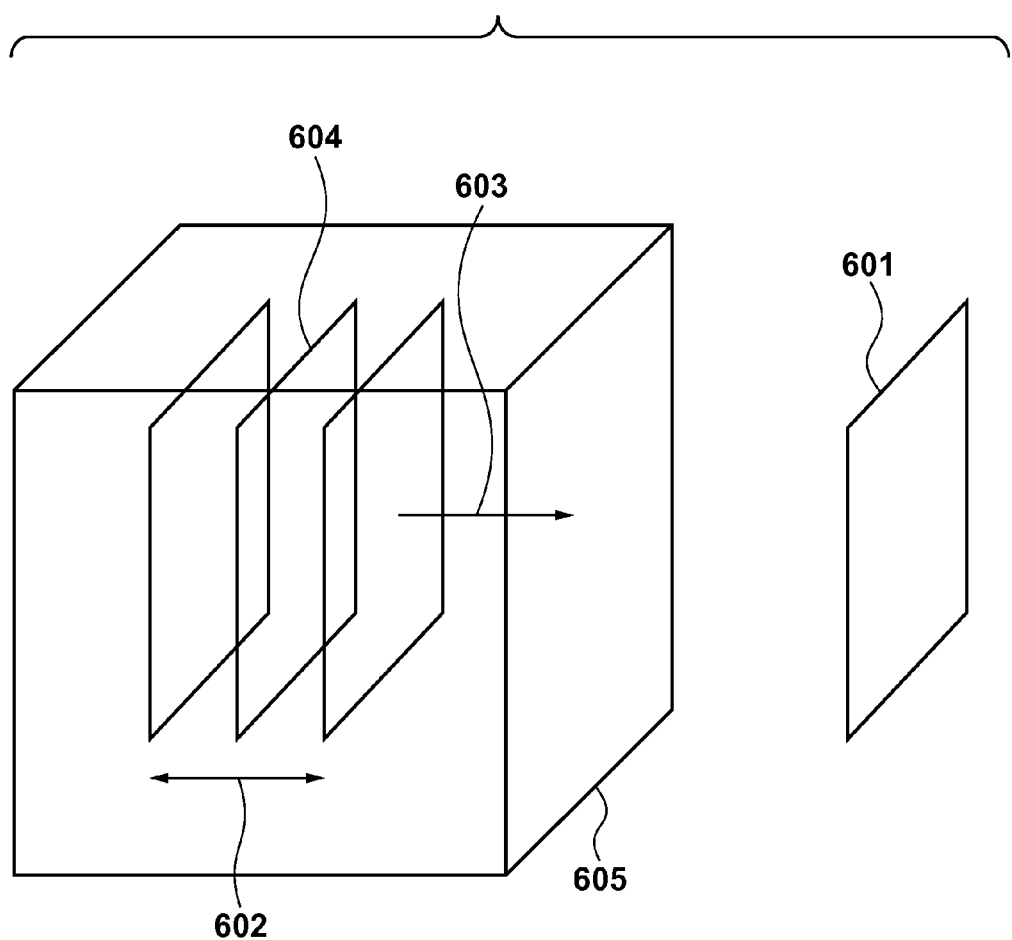
F I G. 6

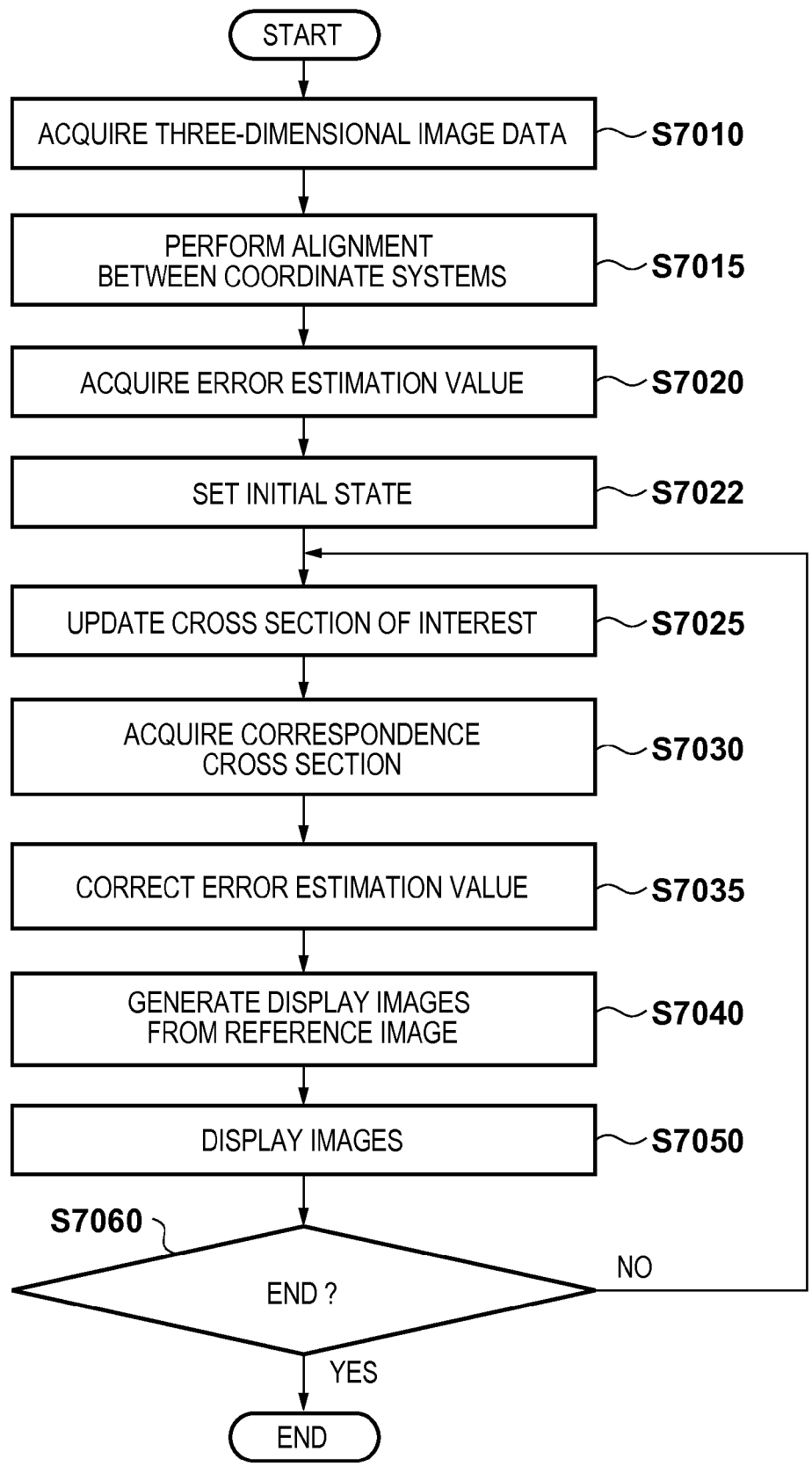

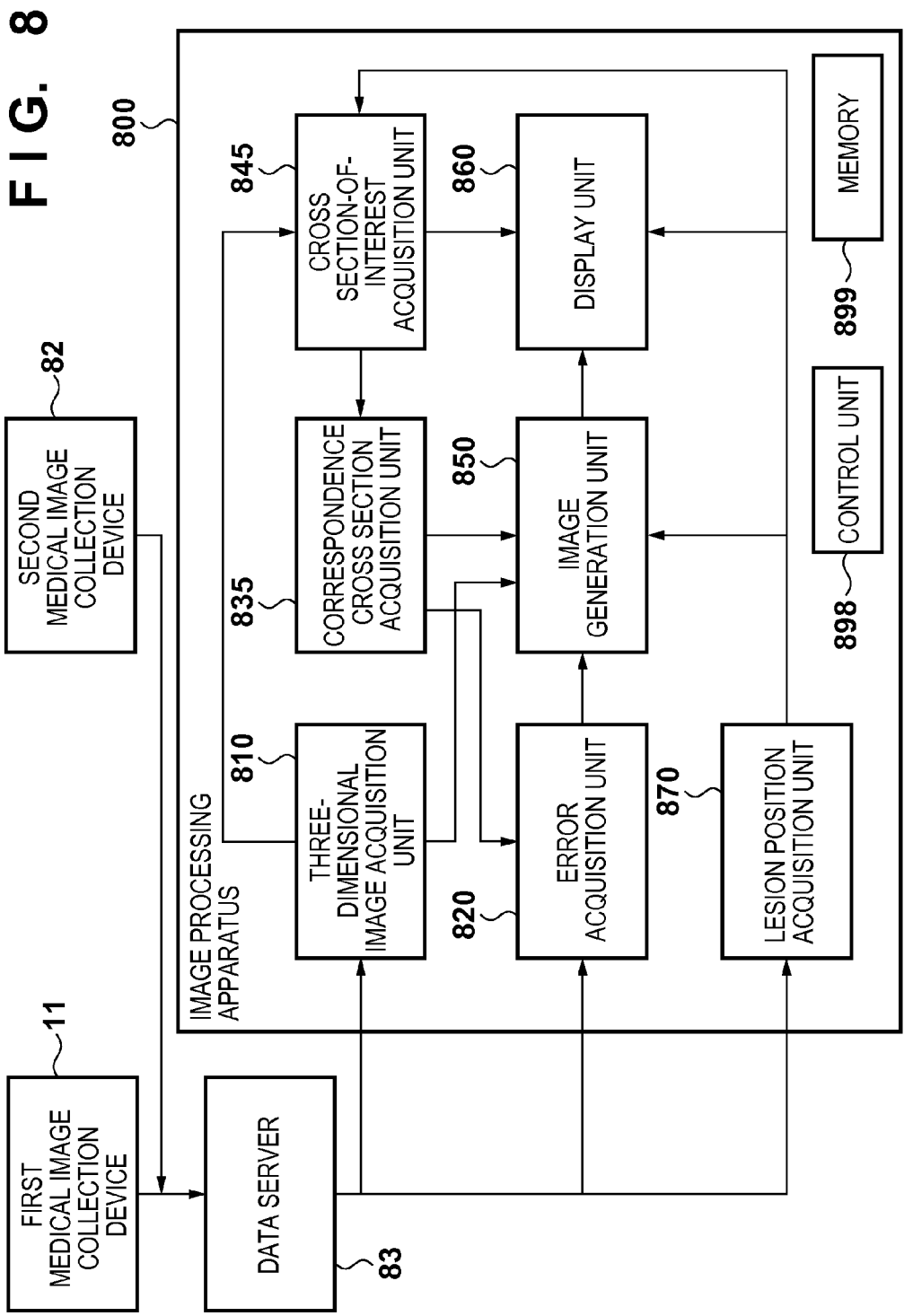

IMAGE PROCESSING APPARATUS AND IMAGE PROCESSING METHOD

BACKGROUND OF THE INVENTION

Field of the Invention

The present invention relates to a technique of processing a medical image captured by a medical image collection device.

Description of the Related Art

In the medical field, a doctor makes diagnosis by displaying, on a monitor, a medical image obtained by capturing an object, and interpreting the displayed medical image. As medical image collection devices (to be referred to as modalities hereinafter) used to capture medical images, an ultrasonic image diagnosis device, a magnetic resonance imaging device (to be referred to as an MRI device hereinafter), an X-ray computed tomography device (to be referred to as an X-ray CT device hereinafter), and the like are known.

It may be difficult to make diagnosis by only observing individual medical images captured by these modalities. To solve this problem, attempts have been made to more correctly make diagnosis by comparing a plurality of types of medical images such as respective medical images captured by a plurality of modalities or those captured at different dates and times.

In order to use a plurality of types of medical images in diagnosis, it is important to identify (associate) lesion portions and the like in respective medical images. Since it is difficult to attain automatic identification by image processing due to the influences of different modalities, deformations of an object, and the like, it is a common practice for an operator such as a doctor to manually (visually) identify lesion portions while observing images. While observing one medical image (to be referred to as a reference image hereinafter), the operator searches another medical image (to be referred to as a target image hereinafter) for a lesion portion corresponding to that in the one medical image, and identifies the lesion portions based on similarities between the shapes of the lesion portions, the appearances of the surrounding portions of the lesion portions, and the like. If a device which presents the medical images has a function of presenting the reference image and the target image side by side, the operator can readily compare the images of the lesion portions, and identify the lesion portions.

Against the backdrop of such demand, an attempt has been made to generate (extract) an image of a cross section (to be referred to as a correspondence cross section hereinafter) corresponding to the imaging cross section of an ultrasonic image being captured in real time based on a three-dimensional medical image (three-dimensional volume data) such as a CT or MRI image captured in advance, thereby presenting the generated image. Note that "corresponding" indicates that the imaging cross section of the ultrasonic image and the cross section on the three-dimensional medical image express almost the same portion of the object. In patent literature 1 (Japanese Patent No. 03871747), for example, the position and orientation of an ultrasonic probe are measured to obtain the relationship between the coordinate system of an ultrasonic image serving as a target image and that of a three-dimensional image serving as a reference image. By assuming that an object is rigid, a cross section obtained by transforming the position and orientation of the imaging cross section of the ultrasonic image to the coordinate system of the reference image is set as a correspondence cross section (the calculated value thereof). An image of the correspondence cross section is extracted and generated from the three-dimensional medical image.

The measurement accuracy of the position and orientation of the ultrasonic probe is not perfect. The shapes and postures of the object at the timings of capturing a three-dimensional medical image and ultrasonic image do not always match. For this reason, processing of calculating a correspondence cross section includes an error. That is, a calculated correspondence cross section may shift from a true correspondence cross section to some extent. However, the display method disclosed in patent literature 1 described above does not consider the error. Depending on the degree of the error, a lesion portion is not displayed on the image of the calculated correspondence cross section in some cases even though the lesion portion has been extracted on the ultrasonic image. As a result, the efficiency of comparison of lesion portions and diagnosis by the operator decreases.

SUMMARY OF THE INVENTION

The present invention has been made in consideration of the above problem, and provides a technique of generating and displaying a reference image corresponding to a target image in consideration of a specific error occurring when specifying a correspondence cross section.

According to the first aspect of the present invention, an image processing apparatus comprises: a cross section information acquisition unit configured to acquire a position and orientation of a cross section image obtained by capturing an object; a three-dimensional image acquisition unit configured to acquire a three-dimensional image obtained by capturing the object; a correspondence cross section calculation unit configured to calculate a correspondence cross section of the cross section image in the three-dimensional image based on the position and orientation; an error acquisition unit configured to acquire an error estimation value of the correspondence cross section; a range determination unit configured to determine, based on the error estimation value, a range within which a display image is generated from the three-dimensional image near the correspondence cross section; and a display unit configured to generate and display the display image based on the range.

According to the second aspect of the present invention, an image processing apparatus comprises: a cross section information acquisition unit configured to acquire a position and orientation of a cross section image obtained by capturing an object; a three-dimensional image acquisition unit configured to acquire a three-dimensional image obtained by capturing the object; a correspondence cross section calculation unit configured to calculate a correspondence cross section of the cross section image in the three-dimensional image based on the position and orientation; a generation unit configured to generate, as display images, images of cross sections along the correspondence cross section near the correspondence cross section; and a display unit configured to display the display images side by side.

According to the third aspect of the present invention, an image processing apparatus comprises: an acquisition unit configured to acquire, from a three-dimensional medical image of an object, a plurality of cross section images based on a range of an error occurring when specifying a correspondence cross section in the three-dimensional medical image corresponding to a cross section of interest of the object; and a display control unit configured to display the cross section images acquired by the acquisition unit on a display screen.

According to the fourth aspect of the present invention, an image processing method comprises: an acquisition step of acquiring, from a three-dimensional medical image of an object, a plurality of cross section images based on a range of an error occurring when specifying a correspondence cross section in the three-dimensional medical image corresponding to a cross section of interest of the object; and a display control step of displaying the cross section images acquired in the acquisition step on a display screen.

According to the fifth aspect of the present invention, an image processing apparatus comprises: a cross section information acquisition unit configured to acquire a position and orientation of a cross section image obtained by capturing an object; a three-dimensional image acquisition unit configured to acquire a three-dimensional image obtained by capturing the object; a correspondence cross section calculation unit configured to calculate a correspondence cross section of the cross section image in the three-dimensional image based on the position and orientation; an image generation unit configured to generate an image near the correspondence cross section from the three-dimensional image according to position and orientation acquisition progress information in the cross section information acquisition unit; and a display unit configured to display the image near the correspondence cross section.

According to the sixth aspect of the present invention, an image processing apparatus comprises: a cross section information acquisition unit configured to acquire a position and orientation of a cross section image obtained by capturing an object; a three-dimensional image acquisition unit configured to acquire a three-dimensional image obtained by capturing the object; a correspondence cross section calculation unit configured to calculate a correspondence cross section of the cross section image in the three-dimensional image based on the position and orientation; an image generation unit configured to generate an image near the correspondence cross section from the three-dimensional image according to the position acquired by the cross section information acquisition unit; and a display unit configured to display the image near the correspondence cross section.

Further features of the present invention will become apparent from the following description of exemplary embodiments (with reference to the attached drawings).

BRIEF DESCRIPTION OF THE DRAWINGS

FIG. 5 is a view showing an example of display of an ultrasonic image and cross section images;

FIG. 6 is a view for explaining projected image generation processing;

FIG. 7 is a flowchart illustrating processing executed by an image processing apparatus 800; and FIG. 8 is a block diagram showing an example of the configuration of a system.

DESCRIPTION OF THE EMBODIMENTS

Figure 1:
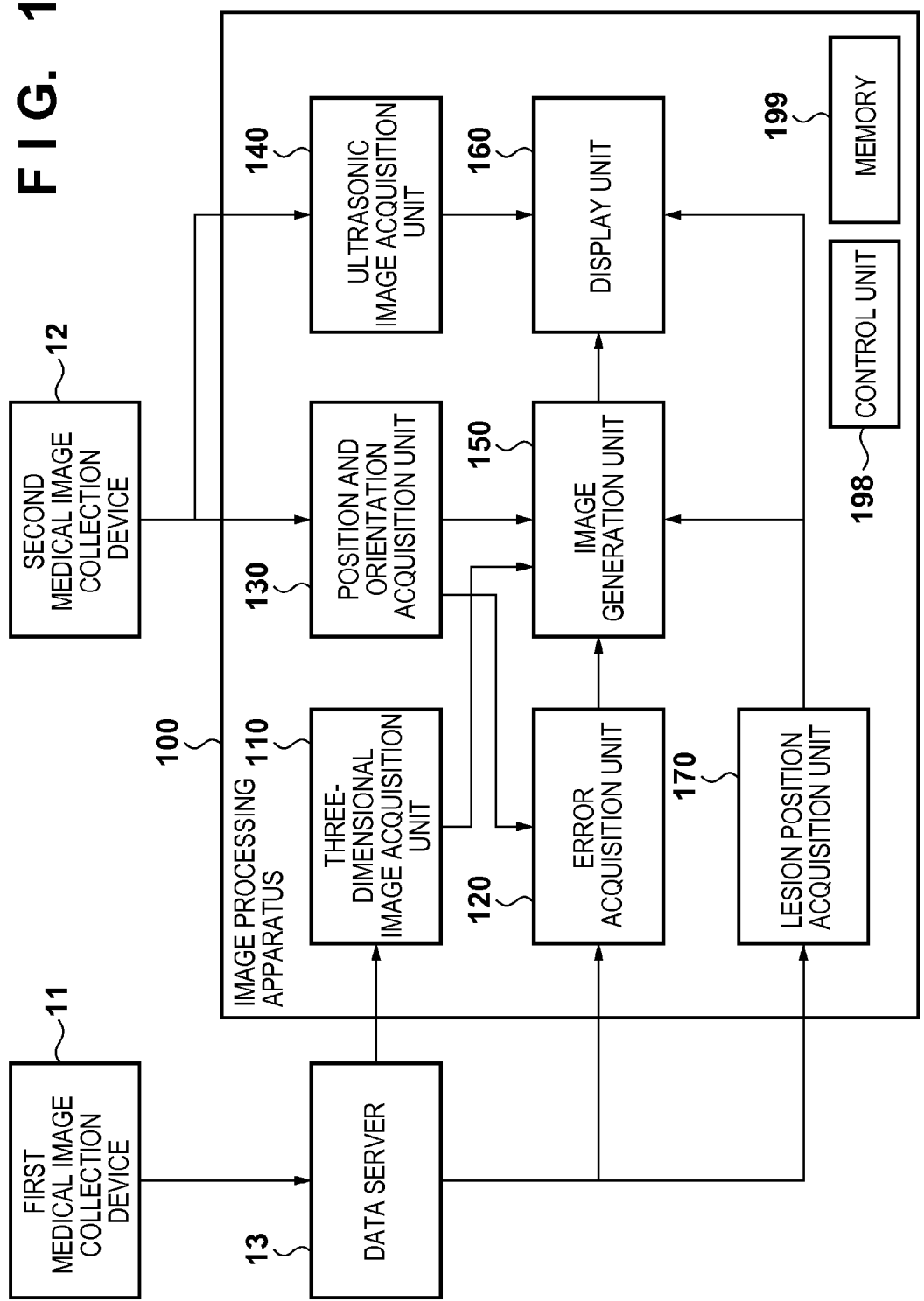
FIG. 1 is a block diagram showing an example of the configuration of a system.

Embodiments of the present invention will be described below with reference to the accompanying drawings. Note that the embodiments to be described below are merely examples when the present invention is practiced concretely, and are detailed embodiments of arrangements described in the appended claims.

First Embodiment

To capture an ultrasonic image in comparison with a three-dimensional medical image of an object captured in advance, an image processing apparatus according to this embodiment generates a plurality of cross section images from the three-dimensional medical image based on the range of an error occurring when calculating the correspondence cross section of the ultrasonic image (performing correspondence cross section calculation). The image processing apparatus then displays the generated images beside the ultrasonic image. The image processing apparatus according to this embodiment will be explained below.

An example of the configuration of a system according to this embodiment will be described first with reference to a block diagram shown in FIG. 1. A data server 13 and a second medical image collection device (medical image diagnosis device) 12 are connected to an image processing apparatus 100 according to this embodiment. Furthermore, a first medical image collection device (medical image diagnosis device) 11 is connected to the data server 13.

The data server 13 will be explained. A three-dimensional medical image of an object captured by the first medical image collection device 11, the position and size of a lesion portion of interest in the three-dimensional medical image, error factor information (to be described alter), and the like are registered in the data server 13.

The three-dimensional medical image is obtained by capturing the object in advance by an MRI device or X-ray CT device serving as the first medical image collection device 11. Note that a case in which an MRI device is used as the first medical image collection device 11 and an MR image is used as a three-dimensional medical image will be described below. In this embodiment, assume that the three-dimensional medical image is expressed as three-dimensional volume data in which a luminance value is stored in a three-dimensional voxel. Assume also that the coordinates of each voxel are expressed on the MRI device coordinate system. The MRI device coordinate system is a coordinate system unique to the MRI device, which has one point in the MRI device as an origin, and three axes orthogonal to each other at this origin as x-, y-, and z-axes.

Note that information handled by the image processing apparatus 100 as known information in the following description is registered in the data server 13 in addition to the above data.

The second medical image collection device 12 will be described next. A case in which an ultrasonic image diagnosis device for capturing an ultrasonic image of an object is used as the second medical image collection device 12 will be explained below. The ultrasonic image diagnosis device captures an ultrasonic image of the object in real time using an ultrasonic probe (not shown). A position and orientation sensor (not shown) measures the position and orientation of the ultrasonic probe. Assume that the position and orientation of the ultrasonic probe are expressed by those on a reference coordinate system with reference to, for example, the object.

Figure 2:
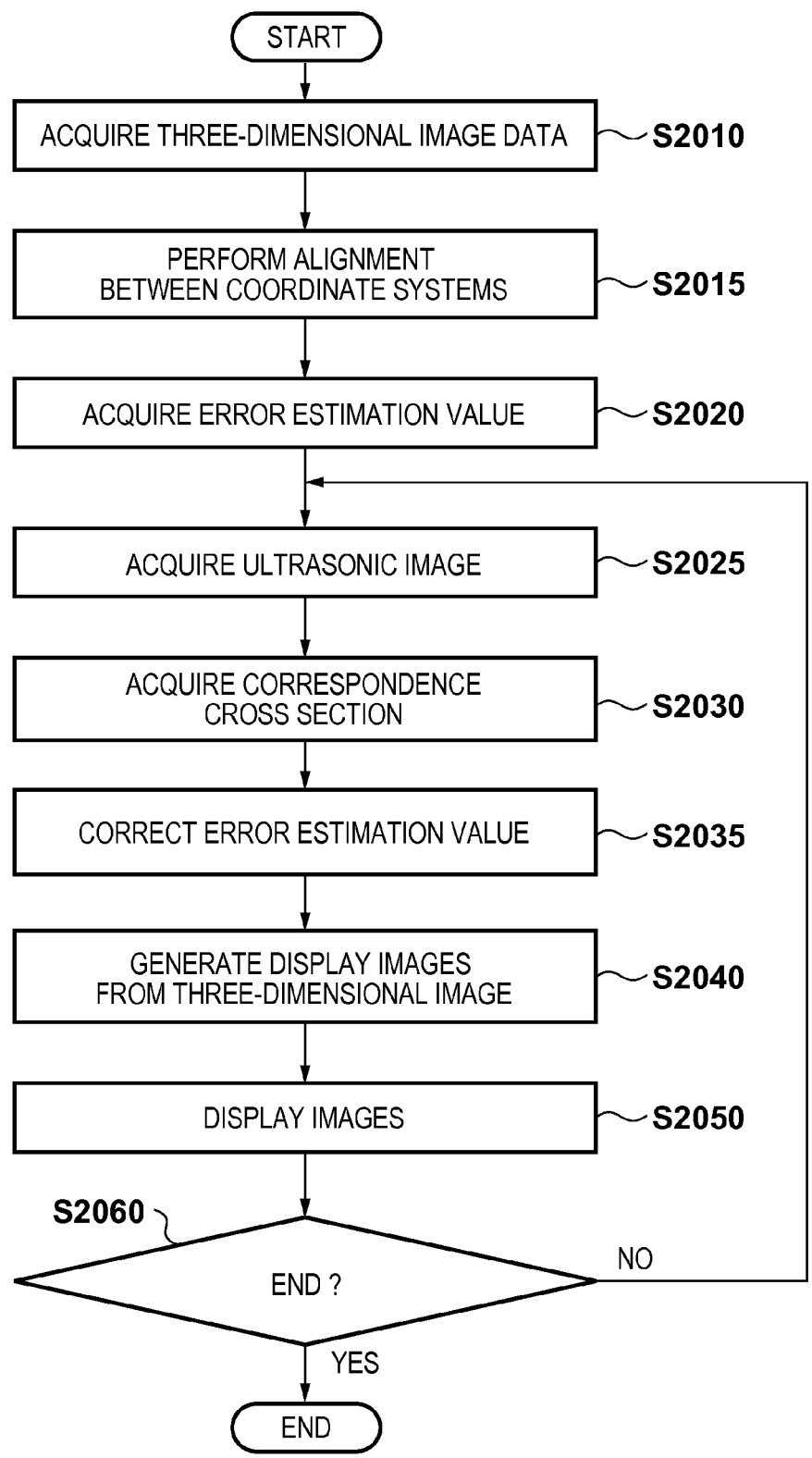
FIG. 2 is a flowchart illustrating processing executed by an image processing apparatus 100.

Processing executed by the image processing apparatus 100 (processes executed by respective functional units except for a control unit 198 among the respective functional units of the image processing apparatus 100 under the control of the control unit 198) will be described with reference to FIG. 2 showing the flowchart of the processing.

<Step S2010: Acquisition of Three-Dimensional Image Data (Three-Dimensional Medical Image Data)>

In step S2010, a three-dimensional image acquisition unit 110 acquires a three-dimensional medical image (MR image) of the object from the data server 13, and outputs the acquired three-dimensional medical image to an image generation unit 150. Note that when information of the position (for example, the barycentric position) and size (for example, the maximum diameter or minimum diameter) of the lesion portion of interest in the three-dimensional medical image of the object is registered in the data server 13, a lesion position acquisition unit 170 acquires the information. The lesion position acquisition unit 170 sends the acquired information to the image generation unit 150 and a display unit 160.

<Step S2015: Alignment Between Coordinate Systems>

In step S2015, a position and orientation acquisition unit 130 performs alignment between the reference coordinate system and the MRI device coordinate system. More specifically, the position and orientation acquisition unit 130 calculates a transformation parameter (for example, a coordinate transformation matrix) representing coordinate transformation from the reference coordinate system to the MRI device coordinate system. This processing can be executed using, for example, three or more landmarks which can be uniquely identified in the three-dimensional medical image acquired in step S2010 and whose positions can be specified on the object. More specifically, the three-dimensional coordinates of a predetermined landmark on the MRI device coordinate system are acquired by selecting the landmark on the image while displaying a cross section image of the three-dimensional medical image by switching a section position. Furthermore, the three-dimensional coordinates of the landmark on the reference coordinate system are acquired by pointing the position of the landmark on the object by the distal end portion of the ultrasonic probe. Based on the correspondence between the measured coordinates of the landmark on the coordinate systems, a coordinate transformation matrix from the reference coordinate system to the MRI device coordinate system is calculated as a transformation matrix which expresses transformation between the corresponding points with a smallest error. As the landmarks, for example, the upper and lower ends of the body of sternum, the outer edge of the collarbone, and the side of ribs can be used.

If the transformation parameter has been obtained in advance by some method, and registered in the data server 13, the position and orientation acquisition unit 130 acquires the transformation parameter from the data server 13 in step S2015, as a matter of course.

<Step S2020: Acquisition of Error Estimation Value>

In step S2020, an error acquisition unit 120 acquires one of pieces of error factor information registered in advance in the data server 13, calculates an error estimation value from the acquired error factor information, and outputs the calculated error estimation value to the image generation unit 150.

The error factor information indicates a factor for the error. For example, the error factor information represents the type of position and orientation sensor (for example, a sensor A or sensor B) for measuring the position and orientation of the ultrasonic probe. In this case, the error acquisition unit 120 acquires error factor information corresponding to a sensor currently used by the second medical image collection device 12 among the pieces of error factor information which are registered in the data server 13 and correspond to respective sensors.

On the other hand, the error estimation value indicates the estimation value of a specific error occurring when specifying a correspondence cross section in a three-dimensional medical image of an object corresponding to a cross section of interest of the object. In this embodiment, the error estimation value indicates the estimation value of an error occurring when specifying a correspondence cross section corresponding to the ultrasonic image of the object from the three-dimensional medical image of the object. This error is caused by various factors, and its error amount varies depending on the factor. There are various methods of calculating (acquiring) an error estimation value by the error acquisition unit 120. For example, an error estimation value corresponding to each piece of error factor information is determined in advance, and registered in a memory 199. The error acquisition unit 120 acquires, from the memory 199, an error estimation value corresponding to the error factor information acquired from the data server 13. When, for example, the error factor information represents the type of position and orientation sensor for measuring the position and orientation of the ultrasonic probe, an error estimation value corresponding to the error factor information is the estimation value of an error based on the characteristics of a position and orientation sensor of this type. In this case, therefore, the error acquisition unit 120 acquires an error estimation value caused by the characteristics of the position and orientation sensor currently used. If, for example, the error factor information indicates that the sensor A as an optical sensor is in use, it is possible to acquire an error estimation value smaller than that when the sensor B as a magnetic sensor is in use.

Note that an error estimation value may be acquired by another processing. For example, information representing a portion name (for example, a liver, pancreas, or breast) of an object may be used as error factor information. In this case, for example, when the user designates, via an operation unit (not shown), a portion to be examined, the error acquisition unit 120 acquires error factor information corresponding to the designated portion to be examined from the data server 13. Furthermore, in this case, an error estimation value corresponding to each portion to be examined is determined in advance (based on the deformability of the portion and the like), and registered in the memory 199. The error acquisition unit 120 acquires, from the memory 199, an error estimation value corresponding to the error factor information (the portion to be examined) acquired from the data server 13.

An error estimation value is not necessarily obtained based on error factor information. For example, error estimation values are determined in advance for respective predetermined error levels 1 to 10, and registered in the memory 199. The error acquisition unit 120 acquires, from the memory 199, an error estimation value corresponding to an error level, of the error levels 1 to 10, designated by the user via an operation unit (not shown).

The user may directly input an error estimation value via an operation unit (not shown), and the error acquisition unit 120 may acquire the input error estimation value. The error estimation value may be a fixed value. The error estimation value may be based on position and orientation acquisition progress information in the position and orientation acquisition unit 130, for example, the motion (operation locus) of the ultrasonic probe and the position and orientation acquisition elapsed time. The error estimation value may be based on the position acquired by the position and orientation acquisition unit 130.

<Step S2025: Acquisition of Ultrasonic Image>

In step S2025, an ultrasonic image acquisition unit 140 acquires an ultrasonic image from the second medical image collection device 12, and outputs the acquired ultrasonic image to the display unit 160 as an image (cross section-of-interest image) of a cross section of interest of the object. The position and orientation acquisition unit 130 acquires, from the second medical image collection device 12, the measured value of the position and orientation of the ultrasonic probe when the ultrasonic image acquisition unit 140 captures the ultrasonic image. The position and orientation acquisition unit 130 calculates the position and orientation of the ultrasonic image on the reference coordinate system based on "a transformation parameter from the position and orientation of the ultrasonic probe to those of the ultrasonic image" registered in advance in the memory 199 as a known value. Note that in this embodiment, the position and orientation of the ultrasonic image is defined by the position and orientation on an image coordinate system expressing the ultrasonic image.

<Step S2030: Acquisition of Correspondence Cross Section>

In step S2030, the position and orientation acquisition unit 130 specifies a correspondence cross section corresponding to the ultrasonic image in the three-dimensional medical image using "the position and orientation of the ultrasonic image on the reference coordinate system" calculated in step S2025. More specifically, the position and orientation acquisition unit 130 transforms "the position and orientation of the ultrasonic image on the reference coordinate system" to the position and orientation of the ultrasonic image on the MRI device coordinate system (the position and orientation of the correspondence cross section) using the transformation parameter calculated in step S2015 (cross section information acquisition). The position and orientation acquisition unit 130 sends the transformed position and orientation to the image generation unit 150.

<Step S2035: Correction of Error Estimation Value>

In step S2035, the error acquisition unit 120 corrects the error estimation value acquired in step S2020. This correction processing may be omitted depending on conditions. There are various methods of correcting the error estimation value. Several examples of the correction method will be described below.

There is provided a method of dynamically changing the error estimation value depending on a portion of the object being captured. For example, the error acquisition unit 120 dynamically sets the correction coefficient of the error estimation value according to the distance from the landmark used in alignment in step S2015 to the cross section-of-interest image (in this embodiment, the ultrasonic image). More specifically, based on the current position and orientation of the cross section of interest on the reference coordinate system and the positions of the respective landmarks, the error acquisition unit 120 calculates the distance from each landmark to the cross section of interest, and selects a landmark closest to the cross section of interest. The error acquisition unit 120 calculates a correction coefficient using a relational expression which gives a smaller correction coefficient as the distance is shorter, and a larger correction coefficient as the distance is longer. The error acquisition unit 120 multiplies the error estimation value obtained in step S2020 by the calculated correction coefficient. This processing sets an error estimation value in consideration of the tendency that the accuracy of alignment is high near the landmark, and decreases as the distance from the landmark becomes longer. Note that the length of a perpendicular drawn from the landmark to the cross section of interest or the distance from the landmark to a predetermined position on the cross section-of-interest image (for example, the central coordinates of the cross section-of-interest image) may be used as the distance from the landmark to the cross section of interest.

There is another method of multiplying the error estimation value acquired in step S2020 by a correction coefficient according to the elapsed time after alignment is performed in step S2015 (a correction coefficient is larger as the elapsed time is longer). In this method, an error estimation value is set in consideration of an increase in alignment error caused by the body motion of the object.

Note that these correction processes may be used singly or in combination. Alternatively, depending on the type of object and conditions, the user may be able to select correction processing to be applied.

<Step S2040: Generation of Display Images>

In step S2040, the image generation unit 150 generates images of a plurality of cross sections (cross section images) as display targets based on the error estimation value obtained in step S2035 (or step S2020) and the position and orientation of the ultrasonic image (the position and orientation of the correspondence cross section) obtained in step S2030. The image generation unit 150 outputs the plurality of generated cross section images to the display unit 160.

Based on the error estimation value, the image generation unit 150 determines a range (image generation range) where an image is generated (range determination). The image generation range is, for example, a range within which the vertical distance from the correspondence cross section is equal to or shorter than the error estimation value. Within this range, a cross section interval and the number of cross sections (cross section images) are set. For example, a fixed value is set as the cross section interval, and the number of cross sections which falls within the image generation range is set under the condition. Assume, for example, that the cross section interval is set to 5 mm. In this case, if the error estimation value is 20 mm, nine cross sections in total, that is, the correspondence cross section and cross sections at positions of ±5, ±10, ±15, and ±20 mm from the correspondence cross section are set. Similarly, if the error estimation value is 40 mm, 17 cross sections in total, that is, the correspondence cross section and cross sections at positions of ±5, ±10, ±15, ±20, ±25, ±30, ±35, and ±40 mm from the correspondence cross section are set.

As described above, since, in step S2030, the position and orientation of the ultrasonic image (the position and orientation of the correspondence cross section) on the MRI device coordinate system have been obtained, and the three-dimensional medical image has been defined on the MRI device coordinate system, it is possible to define a correspondence cross section in the three-dimensional medical image. It is thus possible to make cross section settings for the three-dimensional medical image.

Note that if information about the size of the lesion portion of interest has been acquired in step S2010, the interval may be set based on the information. For example, a distance of ½ the minimum diameter of the lesion portion of interest may be set as the cross section interval. This can avoid a situation in which none of the cross sections includes the lesion portion of interest. Note that the operator may be able to set an arbitrary value as the interval. In such method, if the error estimation value is large, a large number of cross sections are set. If the error estimation value is small, a small number of cross sections are set.

The number of cross sections (cross section count) may be fixed to a predetermined value, and the cross section interval may be set so that the cross sections fall within the image generation range. Assume, for example, that the number of cross sections is set to 9. If the error estimation value is 20 mm, the cross section interval is set to 5 mm because 20×2/(9−1)=5 is obtained. If the error estimation value is 40 mm, the cross section interval is set to 10 mm because 40×2/(9−1)=10 is obtained.

Even if the error estimation value dynamically changes, a group of cross section images is displayed in a given layout, and thus a screen is easy to see. Note that the user may be able to set an arbitrary value as the number of images to be displayed. In this method, if the error estimation value is large, a long interval is set. If the error estimation value is small, a short interval is set.

Note that the cross section intervals are not necessarily equal to each other. Cross sections may be set at shorter intervals as the cross sections are closer to the correspondence cross section, and set at longer intervals as the cross sections are farther away from the correspondence cross section. When, for example, D represents the interval between the correspondence cross section and its adjacent cross section, $\alpha D$ (where $\alpha > 1$) represents the interval between the adjacent cross section and its adjacent cross section (in a direction away from the correspondence cross section), thereby calculating the intervals to the subsequent cross sections in the same manner. Even if the number of cross sections is fixed, it is only necessary to calculate the value of D so that the set number of cross sections falls within the image generation range. This makes it possible to mainly display a portion which is around a true correspondence cross section at high probability.

The image generation unit 150 generates, from the three-dimensional medical image, a cross section image for each (each display cross section) of the correspondence cross section and the respective cross sections (cross sections parallel to the correspondence cross section) set as described above, based on voxels intersecting the display cross section.

At this time, a range where an image is generated within each display cross section can be set to be equal to the imaging range of the ultrasonic image defined on the image coordinate system. Alternatively, a range obtained by adding a predetermined offset to the imaging range can be set. Note that the cross section image to be generated here may be a slab MIP image (thickness-added maximum intensity projected image) generated from a volume obtained by setting a width before and after the cross section by a distance of ½ the cross section interval about each display cross section. This can make information of interest visible even if it exists between cross sections.

<Step S2050: Display of Images>

In step S2050, the display unit 160 displays a list of the ultrasonic image acquired from the ultrasonic image acquisition unit 140 and the plurality of cross section images generated by the image generation unit 150 on a display screen (not shown) (display control).

Figure 3:
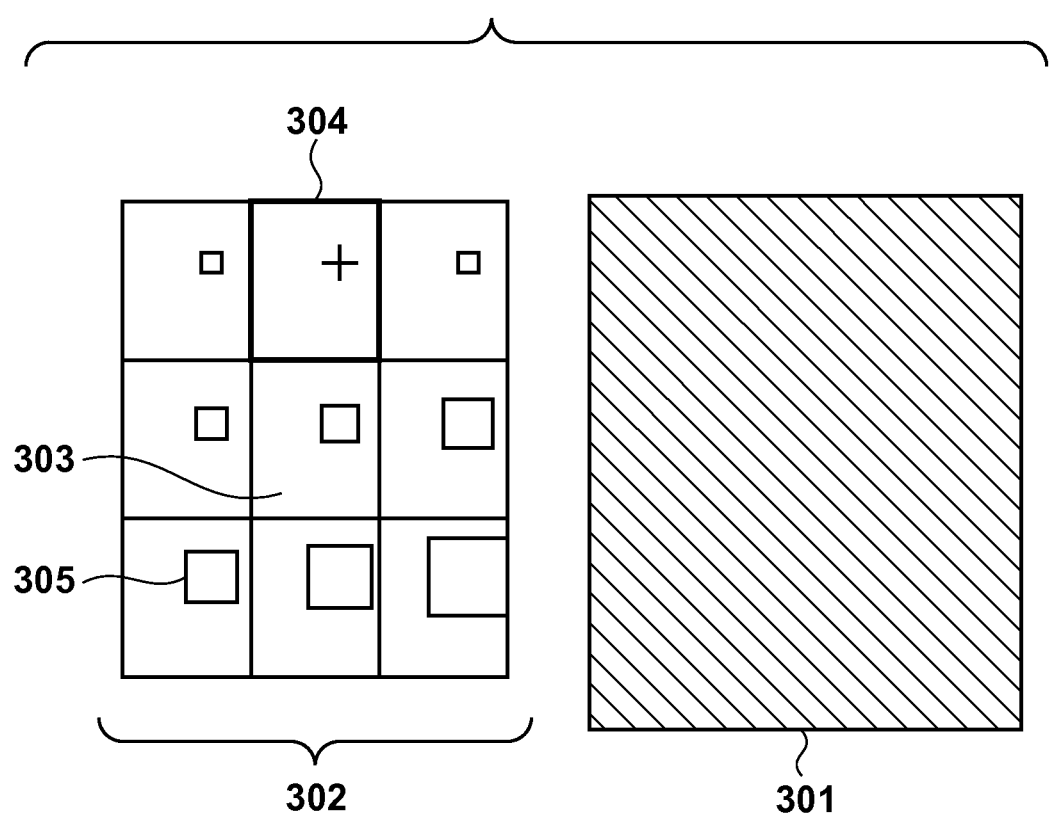
FIG. 3 is a view showing an example of display of an ultrasonic image and cross section images.

FIG. 3 is a schematic view showing a case in which a list of the ultrasonic image and nine cross section images (the correspondence cross section and four cross sections before and after the correspondence cross section). Referring to FIG. 3, a target image 301 indicates the ultrasonic image acquired in step S2025. Reference images 302 indicate the nine cross section images generated in step S2040. Among these images, for example, a cross section image 303 of the correspondence cross section is arranged at the center, an image of a cross section whose vertical distance from the correspondence cross section in the normal line direction (frontward with respect to the correspondence cross screen) is longer is arranged rightward and downward (from the lower left to the lower right). Similarly, an image of a cross section whose vertical distance in a direction opposite to the normal line direction (backward with respect to the correspondence cross section) is longer is arranged leftward and upward (from the upper right to the upper left).

Note that if the information of the position of the lesion portion of interest has been acquired in step S2010, whether the lesion portion of interest is included in each cross section may be determined based on the positional relationship between the lesion portion of interest and the cross section. If there is a cross section including the lesion portion of interest, information indicating it may be presented. As indicated by lesion cross section display 304 shown in FIG. 3, a cross section image including the lesion portion of interest may be emphasized (highlighted) by surrounding the image by a thick frame, or the position of the lesion portion of interest in the cross section image is displayed using a mark "+". The distance from each cross section to the lesion portion of interest may be obtained and displayed on each cross section image as information indicating the positional relationship between the lesion portion of interest and the cross section. For example, as indicated by positional relationship display 305 shown in FIG. 3, a rectangle whose size indicates the distance from the lesion portion of interest to each cross section may be displayed. In this example, a smaller rectangle for a shorter distance or a larger rectangle for a longer distance is displayed at the position of the foot of a perpendicular drawn from the lesion portion of interest to the cross section. With such display, it is possible to clearly identify a specific cross section including the lesion portion of interest, thereby more easily performing an operation of searching the target image for a corresponding lesion portion and identifying the lesion portion.

Figure 4:
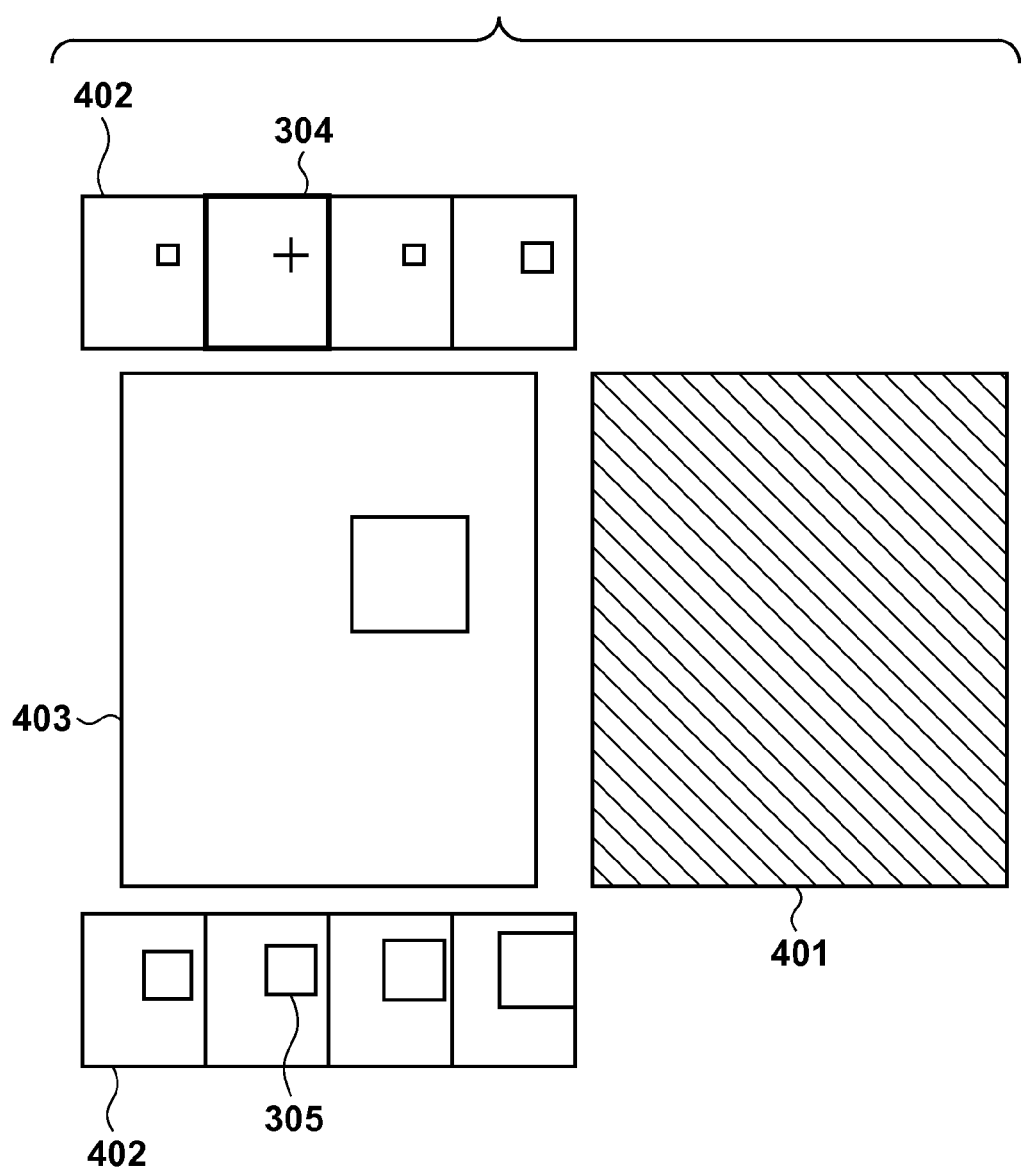
FIG. 4 is a view showing an example of display of an ultrasonic image and cross section images.

Note that the display layout of the cross section images is not limited to that shown in FIG. 3. For example, a display layout shown in FIG. 4 may be used. That is, a correspondence cross section image 403 whose scale coincides with that of a target image 401 is displayed, and reference images 402 other than the correspondence cross section image may be horizontally displayed above and below the correspondence cross section image 403. This layout makes it possible to readily compare the correspondence cross section image with the reference images. It is also possible to readily grasp the positional relationship between the cross sections.

Alternatively, only a region which highly likely includes the lesion portion of interest may be extracted from each cross section, and displayed. This can be implemented by setting, as an extraction region, a rectangular region having as its center the position of the foot of a perpendicular drawn from the lesion portion of interest to each cross section, and generating a display image while changing the size of the extraction region according to the vertical distance from the lesion portion of interest. In this case, the display image is generated by extracting a narrower region for a longer vertical distance or a wider region for a shorter vertical distance. FIG. 5 is a schematic view showing a case in which five cross section images (the correspondence cross section and two cross sections before and after the correspondence cross section) are displayed while changing the extraction region. Referring to FIG. 5, a target image 501 indicates the ultrasonic image obtained in step S2025. Reference images 502 indicate images respectively extracted from the five cross section images generated in step S2040. Among these images, for example, a correspondence cross section image 503 is displayed at the center, and an image of a cross section whose vertical distance from the correspondence cross section in the normal line direction is longer is arranged leftward, and an image of a cross section whose vertical distance in a direction opposite to the normal line direction is longer is arranged rightward. The cross section image including the lesion portion of interest is displayed in a largest size, and an image farther away from the cross section image in the right or left direction is displayed in a smaller size. This can reduce the problem that arranging a number of reference images side by side makes the image display size small. In this embodiment, the display unit 160 displays the plurality of reference images 402. However, it is possible to select at least one of the plurality of reference images 402 using a selection unit (not shown), and enlarge and display at least one of the plurality of reference images 402 on the display unit 160. The display unit 160 may replace the selected reference image by the target image 301, and display it.

<Step S2060: Determination of Whether to End Overall Processing>

In step S2060, the control unit 198 determines whether the end condition of the processing according to the flowchart shown in FIG. 2 has been satisfied. There are various end conditions, and the present invention is not limited to a specific condition. For example, when the user presses a predetermined key (end key) of a keyboard connected to the apparatus, the control unit 198 determines that the end condition has been satisfied.

If the control unit 198 determines that the end condition has been satisfied, the process ends after step S2060. On the other hand, if the control unit 198 determines that the end condition has not been satisfied, the process returns to step S2025 after step S2060, and the processes in the subsequent steps are executed for a newly acquired ultrasonic image.

As described above, according to this embodiment, it is possible to generate and display images of a plurality of cross sections near a correspondence cross section based on an error estimation value. With this processing, cross section images which cover an error range are displayed. That is, even if there is an error in calculated value of the correspondence cross section, display is provided in which one of the cross section images includes a true correspondence cross section (or a cross section close to it). As a result, the operator can simultaneously observe the cross section including the lesion portion of interest and a corresponding lesion portion. At this time, since the display range is changed according to the error estimation value, the number of displayed cross section images can be minimized. Consequently, the operator need not see images more than necessary, and it is possible to avoid displaying images by reducing them more than necessary.

Note that images of a plurality of cross sections near a correspondence cross section are generated and displayed based on an error estimation value in this embodiment. This embodiment can be implemented without obtaining the error estimation value.

The image generation unit 150 calculates the correspondence cross section of a cross section image in the three-dimensional image based on the position and orientation of the ultrasonic probe acquired by the position and orientation acquisition unit 130. The image generation unit 150 generates images near the correspondence cross section from the three-dimensional image according to the position and orientation acquisition progress information in the position and orientation acquisition unit 130. The display unit 160 then displays the images near the correspondence cross section.

More specifically, the image generation unit 150 generates images near the correspondence cross section when the motion (operation locus) of the ultrasonic probe as the position and orientation acquisition progress information in the position and orientation acquisition unit 130 indicates a predetermined distance or longer (for example, 3 m or longer). When the acquisition elapsed time as the position and orientation acquisition progress information in the position and orientation acquisition unit 130 reaches a predetermined time (for example, 30 sec), the image generation unit 150 generates images near the correspondence cross section. When the position and orientation acquisition progress information (acquisition elapsed time) in the position and orientation acquisition unit 130 further reaches a predetermined time (for example, 60 sec), the image generation unit 150 generates a larger number of images near the correspondence cross section (within a wider range).

Even if an error occurs in the position and orientation in the position and orientation acquisition unit 130 along with the acquisition elapsed time, it is possible to prevent the efficiency of comparison of lesion portions and diagnosis by the operator from decreasing by generating images near the correspondence cross section.

The position and orientation acquisition unit 130 acquires the position and orientation of the ultrasonic probe using an optical sensor or magnetic sensor. If the distance between the ultrasonic probe and the source (light source) of the optical sensor or that (magnetic field source) of the magnetic sensor is long, an error may occur in the position and orientation acquired by the position and orientation acquisition unit 130. The image generation unit 150 generates images near the correspondence cross section from the three-dimensional image according to the position acquired by the position and orientation acquisition unit 130. More specifically, if the distance between the ultrasonic probe and the source (light source) of the optical sensor or that (magnetic field source) of the magnetic sensor is a predetermined distance or longer (for example, 3 m or longer), the image generation unit 150 generates images near the correspondence cross section. The display unit 160 displays the images near the correspondence cross section.

Even if, therefore, an error occurs in the position and orientation in the position and orientation acquisition unit 130 due to the position of the ultrasonic probe, it is possible to prevent the efficiency of comparison of lesion portions and diagnosis by the operator from decreasing by generating images near the correspondence cross section.

Second Embodiment

In the first embodiment, a plurality of cross section images within the image generation range set based on the error estimation value are displayed side by side. However, one cross section image may be generated at each time while changing a cross section position within the image generation range at each time, and the generated images may be switched and displayed. Differences from the first embodiment will be mainly described below and a description of the same points as in the first embodiment will be omitted.

The arrangement of an image processing apparatus according to this embodiment is the same as that shown in FIG. 1 in the first embodiment except for the operations of an image generation unit 150 and display unit 160. In a flowchart illustrating processing executed by the image processing apparatus according to this embodiment, processes in steps S2040 and S2050 of the flowchart shown in FIG. 2 are different from those in the first embodiment. That is, processes except for those in steps S2040 and S2050 are the same as those in the first embodiment.

<Step S2040: Generation of Display Image>

In step S2040, the image generation unit 150 generates one cross section image as a display target based on an error estimation value obtained in step S2035 (or step S2020) and the position and orientation of an ultrasonic image (the position and orientation of a correspondence cross section) obtained in step S2030. The image generation unit 150 outputs the generated one cross section image to the display unit 160.

To generate a cross section image, the image generation unit 150 determines an image generation range based on the error estimation value, similarly to the processing in step S2040 in the first embodiment. The image generation unit 150 determines one cross section as a display target within the range by processing (to be described below). A counter k for counting the number of times the processing in this step is executed is prepared. When the processing in this step is executed for the first time, the value of k is set to 0 as the initial value. When the processing in this step is executed for the second time and thereafter, 1 is added to the value of k every time. Let d be the image generation range (the image generation range is ±d [mm] from the correspondence cross section). Then, a cross section position p is calculated based on the value of the counter k, as given by:

$$p = d \times \sin(2\pi k/T)$$

where T represents a parameter for controlling a display cycle, and is preset to a predetermined value. For example, assume that T=40. In this case, the cross section position p is calculated so that p=0 is obtained when k=0, p=d is obtained when k=10, p=0 is obtained when k=20, p=−d is obtained when k=30, and p returns to the initial state when k=40. The image generation unit 150 determines, as a display cross section, a cross section a distance of p away from the correspondence cross section in the vertical direction based on the cross section position p calculated according to the above equation. Finally, the image generation unit 150 generates a cross section image of the set display cross section from a three-dimensional medical image by performing the same processing as that in the first embodiment.

Note that by allowing the user to input a control command for changing the update state of the counter k, the command may be acquired at the start of the processing in this step, and the update state may be accordingly changed when the command is acquired. Only if the update state is ON, the value of k is updated. If the updated state is OFF, k is not updated. This enables the user to stop display of the correspondence cross section when he/she wants to stop the display.

Instead of representing, by k, the number of times the processing in this step is executed, the user may manually input a control command for the value of k. In this case, it is only necessary to acquire the command at the start of the processing in this step, add 1 to the value of k every time an "increase" command is acquired, and subtract 1 from the value of k every time a "decrease" command is acquired.

An increase/decrease command for the value of p, which is input by the user, may be acquired, and the value of p may be determined based on the command (without using the above equation). In this case, the value of p is controlled to fall within the range of the error estimation value or smaller (that is, ±d).

With such method, it is possible to control the cross section position displayed by the user within the range of the error estimation value or smaller (that is a range within which a true correspondence cross section can exist). When there is a calculation error of the correspondence cross section, therefore, it is possible to readily perform an operation of correcting the error.

<Step S2050: Display of Images>

In step S2050, the display unit 160 displays an ultrasonic image acquired from the ultrasonic image acquisition unit 140 and the one cross section image generated by the image generation unit 150 on a display screen (not shown) side by side. The display layout is not limited to this, as a matter of course.

As described above, according to this embodiment, a moving cross section position is limited within the image generation range determined based on the error estimation value. This prevents a cross section image at a distance of the error estimation value or more from being displayed. As a result, the user can correct the shift of the correspondence cross section while preventing, from being generated, an unnecessary cross section image which is not used in diagnosis and includes no lesion portion.

Third Embodiment

In steps S2040 and S2050 of the first embodiment, the display unit 160 displays the cross section images generated by the image generation unit 150. However, instead of displaying the cross section images, a projected image may be displayed. The projected image is generated by projecting each voxel of a three-dimensional medical image onto a two-dimensional image in an arbitrary direction. In this embodiment, the generated projected image is output to a display unit 160, and displayed beside an acquired ultrasonic image.

The arrangement of an image processing apparatus according to this embodiment is the same as that of the image processing apparatus 100 according to the first embodiment shown in FIG. 1. Note that parts of the processes of an image generation unit 150 and the display unit 160 are different from those in the first embodiment. A flowchart for the image processing apparatus according to this embodiment is the same as that for the image processing apparatus 100 according to the first embodiment shown in FIG. 2. However, display image generation processing in step S2040 and display processing in step S2050 are different from those in the first embodiment. These processes will be described below.

<Step S2040: Generation of Display Image>

In step S2040, the image generation unit 150 generates a projected image as a display target based on an error estimation value obtained in step S2035 (or step S2020), and the position and orientation of an ultrasonic image (the position and orientation of a correspondence cross section) obtained in step S2030. The image generation unit 150 outputs the generated projected image to the display unit 160.

Projected image generation processing will be described with reference to FIG. 6. To generate a projected image 601, the image generation unit 150 determines, based on the error estimation value, a target range 602 of voxels to be projected. The target range 602 is, for example, a range where the vertical distance from the correspondence cross section is equal to or smaller than the error estimation value. That is, the target range 602 is set wider as the error estimation value is larger. The target range 602 is set narrower as the error estimation value is smaller. The normal line direction of a correspondence cross section 604 is set as a projection direction 603, and all voxels of an MR image 605, which exist within the target range 602, are projected onto the pixels of the projected image 601 in the projection direction 603. Based on the values of the projected voxels, the luminance values of the respective pixels of the projected image 601 are calculated. The maximum intensity projected image within the target range 602 is generated by, for example, searching voxels projected onto one pixel for a voxel having a largest value, and setting the largest value as the pixel value of the pixel.

<Step S2050: Display of Images>

In step S2050, the display unit 160 displays an ultrasonic image acquired from an ultrasonic image acquisition unit 140 and the one projected image generated by the image generation unit 150 on a display screen (not shown) side by side. The display layout is not limited to this, as a matter of course.

As described above, according to this embodiment, the range of voxels to be projected is determined based on the error estimation value, and one projected image is generated using the voxels within the range. With this processing, a small lesion portion existing within the target range is displayed in the projected image. As a result, even if there is an error in the calculated value of the correspondence cross section, it is possible to prevent, from being missed, a small lesion portion which is difficult to be displayed in a cross section image.

Fourth Embodiment

The image processing apparatus according to the first embodiment has as its object to compare an ultrasonic image being captured in real time with a three-dimensional medical image of an object captured in advance. However, a plurality of three-dimensional medical images captured in advance may be display targets. That is, instead of using the ultrasonic image being captured in real time as one image, a three-dimensional medical image of an object captured in advance by another modality (for example, an X-ray CT device) may be used. In this case, for a cross section of interest set in one three-dimensional medical image, a correspondence cross section (computed correspondence cross section) is calculated in the other three-dimensional image. Similarly to the first embodiment, a plurality of cross section images are generated and displayed in consideration of an error of the correspondence cross section.

An example of the configuration of a system according to this embodiment will be described with reference to a block diagram shown in FIG. 8. Note that in FIG. 8, the same reference numerals as those shown in FIG. 1 denote the same functional units and a description thereof will be omitted.

A data server 83 and a second medical image collection device 82 are connected to an image processing apparatus 800 according to this embodiment. A first medical image collection device 11 is connected to the data server 83.

The data server 83 will be described first. Similarly to the data server 13, a three-dimensional medical image (first three-dimensional medical image) of an object captured by the first medical image collection device 11, the position and size of a lesion portion of interest in the three-dimensional medical image, the above-described error factor information, and the like are registered in the data server 83.

Furthermore, another three-dimensional medical image (second three-dimensional medical image) obtained by capturing the object in advance by the second medical image collection device 82, and the position and size of the lesion portion of interest in the second three-dimensional medical image are registered in the data server 83.

Assume that the coordinates of each voxel in the first three-dimensional medical image are represented by the image coordinate system (to be referred to as the first coordinate system hereinafter) of the first three-dimensional medical image. Similarly, assume that the coordinates of each voxel in the second three-dimensional medical image are represented by the image coordinate system (to be referred to as the second coordinate system hereinafter) of the second three-dimensional medical image.

Note that a case will be described below in which an MRI device is used as the first medical image collection device 11 to acquire an MR image as the first three-dimensional medical image, and an X-ray CT device is used as the second medical image collection device 82 to acquire an X-ray CT image as the second three-dimensional medical image. The first medical image collection device 11 and the second medical image collection device 82 may have the same modality, and different three-dimensional medical images may be obtained. For example, a plurality of X-ray CT images captured by an X-ray CT device at different times are acquired.

Processing executed by the image processing apparatus 800 (processes executed by respective functional units except for a control unit 898 among the respective functional units of the image processing apparatus 800 under the control of the control unit 898) will be described with reference to FIG. 7 showing the flowchart of the processing.

<Step S7010: Acquisition of Three-Dimensional Image Data>

In step S7010, a three-dimensional image acquisition unit 810 acquires the first three-dimensional medical image and the second three-dimensional medical image from the data server 83, and outputs the acquired three-dimensional medical images to an image generation unit 850. Note that when information of the positions (for example, the barycentric positions) and sizes (for example, the maximum diameters or minimum diameters) of lesion portions of interest in the first three-dimensional medical image and the second three-dimensional medical image is registered in the data server 83, a lesion position acquisition unit 870 acquires the information. The lesion position acquisition unit 870 sends the acquired information to the image generation unit 850, a display unit 860, and a cross section-of-interest acquisition unit 845.

<Step S7015: Alignment Between Coordinate Systems>

In step S7015, a correspondence cross section acquisition unit 835 performs alignment between the first coordinate system and the second coordinate system. More specifically, the correspondence cross section acquisition unit 835 calculates a transformation parameter (for example, a coordinate transformation matrix) representing coordinate transformation between the coordinate systems. This processing is the same as that in step S2015 of the first embodiment except that three or more landmarks in both the three-dimensional medical images are identified and designated.

<Step S7020: Acquisition of Error Estimation Value>

In step S7020, an error acquisition unit 820 acquires an error estimation value, similarly to step S2020 in the first embodiment. This processing, however, is different from that in the first embodiment in that no calculation is performed using the type of sensor as error factor information to acquire the error estimation value. That is, this error estimation value is an estimation value of a specific error occurring when specifying a cross section in one three-dimensional medical image corresponding to a cross section in the other three-dimensional medical image.

<Step S7022: Setting of Initial State>

In step S7022, the cross section-of-interest acquisition unit 845 sets, as the initial state, the first three-dimensional medical image as a target image, and the second three-dimensional medical image as a reference image. The cross section-of-interest acquisition unit 845 determines the initial value of a cross section of interest in the target image. For example, an axial cross section including the central coordinates of the target image is set as the initial value of the cross section of interest. If the position of the lesion portion of interest on the target image has been acquired in the processing in step S7010, an axial cross section having the position of the lesion portion of interest as its central position may be used as the initial value of the cross section of interest. Alternatively, a cross section where the sectional area of the lesion portion of interest is largest may be calculated, and used as the initial value of the cross section of interest.

<Step S7025: Update of Cross Section of Interest>

In step S7025, in response to an instruction from the user, the cross section-of-interest acquisition unit 845 executes processing of switching between the reference image and the target image. For example, the cross section-of-interest acquisition unit 845 switches between the target image and the reference image in accordance with the position of a mouse cursor on a display screen which is displayed as a result of the processing in step S7050. More specifically, when the mouse cursor is positioned within the drawing area of the first three-dimensional medical image, the first three-dimensional medical image is set as the target image. When the mouse cursor is positioned within the drawing area of the second three-dimensional medical image, the second three-dimensional medical image is set as the target image. Note that when the reference image is switched to the target image, it is possible to set, as a cross section-of-interest image, an image selected by the user using a mouse or the like from a group of cross section images of the reference image displayed at that time as a result of the processing in step S7050.

In the processing in this step, the cross section-of-interest acquisition unit 845 updates the cross section of interest on the target image. This processing is executed when, for example, the user manually inputs a command to change the position and orientation of the cross section of interest from the current value via a predetermined UI (User Interface) such as a keyboard or mouse. Finally, the cross section-of-interest acquisition unit 845 generates an image of the cross section of interest as a cross section-of-interest image from the target image, and outputs the generated image to the display unit 860.

<Step S7030: Acquisition of Correspondence Cross Section>

In step S7030, the correspondence cross section acquisition unit 835 calculates the position and orientation of a correspondence cross section on the reference image corresponding to the cross section of interest using the transformation parameter calculated in step S7015, and outputs the position and orientation to the image generation unit 850.

<Step S7035: Correction of Error Estimation Value>

In step S7035, the error acquisition unit 820 corrects the error estimation value acquired in step S7020. This processing is the same as that in step S2035 of the first embodiment except that no correction processing is executed along with the lapse of time.

<Step S7040: Generation of Cross Section Images>

In step S7040, the image generation unit 850 generates a plurality of cross section images as display targets based on the error estimation value obtained in step S7035 (or step S7020) and the position and orientation of the correspondence cross section obtained in step S7030. The image generation unit 850 outputs the plurality of generated cross section images to the display unit 860. Note that the method of generating the cross section images based on the error estimation value is the same as the processing (processing in step S2040) executed by the image generation unit 150 of the image processing apparatus 100 according to the first embodiment and a detailed description thereof will be omitted.

<Step S7050: Display of Images>

In step S7050, the display unit 860 displays a list of the image of the cross section of interest of the target image generated in step S7025 and the plurality of cross section images generated from the reference image in step S7040 on the display screen (not shown).

This processing is the same as that in step S7050 of the first embodiment except that when the first three-dimensional medical image is the target image, the cross section-of-interest image is displayed in the left portion of the screen and the cross section image group of the reference image is displayed in the right portion of the screen, and when the second three-dimensional medical image is the target image, the cross section-of-interest image is displayed in the right portion of the screen and the cross section image group of the reference image is displayed in the left portion of the screen. The display layout in this step is not limited to them, as a matter of course.

<Step S7060: Determination of Whether to End Overall Processing>

In step S7060, the control unit 898 determines whether the end condition of the processing according to the flowchart shown in FIG. 7 has been satisfied. If the control unit 898 determines that the end condition has been satisfied, the process ends after step S7060. On the other hand, if the control unit 898 determines that the end condition has not been satisfied, the process returns to step S7025 after step S7060.

As described above, according to this embodiment, for the cross section-of-interest image in one three-dimensional medical image, a plurality of cross section images near a computed correspondence cross section in the other three-dimensional medical image are simultaneously displayed. When comparing the two three-dimensional medical images, therefore, even if there is an error in alignment between the images to some extent, it is possible to display and compare corresponding cross section images. Furthermore, by automatically setting, as a cross section of interest, a cross section including the lesion portion of interest, it is possible to display the correspondence cross section image of the lesion portion of interest without any labor. Note that even if three or more three-dimensional medical images are used, it is possible to compare the images in the same manner by calculating a cross section corresponding to a cross section of interest set in the first three-dimensional medical image in each of the second and third three-dimensional medical images, and generating and displaying cross section images based on an error estimation value.

Modification 1

In the first to third embodiments, the arrangement has been explained in which the second medical image collection device 12 serves as an ultrasonic image diagnosis device, and an ultrasonic image being captured in real time by the ultrasonic image diagnosis device is acquired. However, an arrangement may be adopted in which a group of ultrasonic images with position and orientation information acquired in advance by the ultrasonic image diagnosis device having a position and orientation measurement function is registered in advance in the data server 13, and then acquired. In this case, in the processing in step S2025, the ultrasonic image acquisition unit 140 acquires an ultrasonic image at one time and its position and orientation information from the data server 13 in response to a request from the image processing apparatus 100 (control unit 198).

Modification 2

In each of the aforementioned embodiments, a case in which three-dimensional volume data is used as a three-dimensional medical image has been exemplified. The three-dimensional medical image, however, may be in a format except for the three-dimensional volume data. For example, a group of cross section images with position and orientation information may be used as a three-dimensional medical image. For example, a group of ultrasonic images with position and orientation information acquired in advance by the ultrasonic image diagnosis device having the position and orientation measurement function can be used as a three-dimensional image. In this case, in step S2040 (or S7040), the image generation unit 150 (or image generation unit 850) need only generate a desired cross section image from the group of cross section images with position and orientation information.

Each of the aforementioned embodiments and modifications may be solely implemented, or some or all of the arrangements described in two or more of the embodiments and modifications may appropriately be used in combination.

Modification 3

In the first, second, and third embodiments, an ultrasonic image is acquired and displayed as a cross section-of-interest image. The processing of acquiring and displaying the cross section-of-interest image is not always necessary. For example, for the purpose of designating a cross section of interest of the object by some unit, and observing the cross section image of a three-dimensional medical image corresponding to it, the processing of acquiring and displaying the cross section-of-interest image may be omitted from the above-described arrangements. In this case, in the system configuration, the ultrasonic image diagnosis device as the second medical image collection device 12 becomes unnecessary. The ultrasonic image acquisition unit 140 of the image processing apparatus 100 also becomes unnecessary.

As a unit for designating a cross section of interest of the object, for example, a mock-up having the same shape as that of the ultrasonic probe and mounted with a position and orientation sensor can be used. The position and orientation acquisition unit 130 acquires the measured value of the position and orientation of the mock-up from the position and orientation sensor by executing the same processing as that in step S2025, and calculating the position and orientation of the cross section of interest on the reference coordinate system. At this time, it is only necessary to consider the mock-up as a virtual ultrasonic probe, and perform calculation so as to set, as the cross section of interest, a virtual ultrasonic cross section captured by the mock-up. Note that as the unit for designating the cross section of interest of the object, any other methods such as a method of using a plate mounted with a position and orientation sensor (a plane obtained by extending the plate into the body is set as the cross section of interest) may be used.

It is possible to display a three-dimensional medical image corresponding to the cross section of interest of the object by using the position and orientation of the cross section of interest designated by the above method instead of the position and orientation of the ultrasonic image in the subsequent steps.

Fifth Embodiment

The respective functional units of an image processing apparatus 100 (800) shown in FIG. 1 or 8 may be implemented by hardware. However, respective functional units except for a control unit 198 (898) and a memory 199 (899) may be implemented by software (computer programs).

In this case, the memory 199 (899) stores the software programs, and the control unit 198 (898) reads out and executes the software programs. The control unit 198 (898) executes the respective processes described as processes executed by the image processing apparatus 100 (800).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-185700, filed Sep. 6, 2013 and 2014-170901, filed Aug. 25, 2014 which are hereby incorporated by reference herein in their entirety.

What is claimed is:
1. An image processing apparatus comprising:
a cross section image acquisition unit configured to acquire a cross section image generated by capturing an object with a probe;

an information acquisition unit configured to acquire information on a position and orientation of the probe capturing the object;

a three-dimensional image acquisition unit configured to acquire a three-dimensional image generated by capturing the object;

a correspondence cross section calculation unit configured to calculate a correspondence cross section of the cross section image in the three-dimensional image based on the information on the position and orientation;

an error acquisition unit configured to acquire an error estimation value of measurement accuracy of the position and orientation of the probe;

a range determination unit configured to determine a range based on the correspondence cross section and the error estimation value;

a generation unit configured to generate a display image from the three-dimensional image based on the range; and a display control unit configured to display the display image on a display screen.

2. The apparatus according to claim 1, wherein the generation unit is configured to generate, as the display image, cross section images of a plurality of cross sections parallel to the correspondence cross section based on the range.

3. The apparatus according to claim 2, further comprising:
a unit configured to acquire information on a size of a lesion portion of interest,
wherein the generation unit is configured to determine an interval between the cross sections based on the information on the size of the lesion portion of interest.

4. The apparatus according to claim 2, further comprising:
a unit configured to acquire information on a position of a lesion portion of interest,
wherein the generation unit is configured to obtain, based on the information on the position of the lesion portion of interest, a range within which an image is extracted from each of the cross sections, and to generate a cross section image within the range.

5. The apparatus according to claim 1, wherein the generation unit is configured to generate, as the display image, a projected image from the three-dimensional image based on the range.

6. An image processing apparatus comprising:
a cross section image acquisition unit configured to acquire a cross section image generated by capturing an object with a probe;
an information acquisition unit configured to acquire information on a position and orientation of the probe capturing the object;
a three-dimensional image acquisition unit configured to acquire a three-dimensional image generated by capturing the object;
a correspondence cross section calculation unit configured to calculate a correspondence cross section of the cross section image in the three-dimensional image based on the information on the position and orientation;
a generation unit configured to generate, as display images, images of cross sections parallel to the correspondence cross section;
a display control unit configured to display the display images on a display screen; and
a unit configured to acquire information on a size of a lesion portion of interest,
wherein the display control unit determines an interval between the cross sections based on the information on the size of the lesion portion of interest.

7. The apparatus according to claim 1, further comprising:
a unit configured to switch a three-dimensional image in which the information on the position and orientation are acquired.

8. The apparatus according to claim 2, wherein the display control unit is configured to display, side by side, the cross section images on the display screen.

9. The apparatus according to claim 1, wherein the error acquisition unit is configured to acquire the error estimation value based on information on acquisition progress of the position and orientation of the probe capturing the object.

10. The apparatus according to claim 2, wherein the display control unit is configured to display a list of the cross section images on the display screen.

11. The apparatus according to claim 6, wherein the display control unit is configured to display the display images side by side on the display screen.

12. The apparatus according to claim 6, wherein the display control unit is configured to display a list of the display images on the display screen.

13. An image processing method comprising:
acquiring a cross section image generated by capturing an object with a probe;
acquiring information on a position and orientation of the probe capturing the object;
acquiring a three-dimensional image generated by capturing the object;
acquiring an error estimation value of measurement accuracy of the position and orientation of the probe;
determining a range based on the information on the position and orientation of the probe and the error estimation value;
generating a display image from the three-dimensional image based on the range; and
displaying the display image on a display screen.

14. A non-transitory computer-readable storage medium storing a computer program for causing a computer to function as units comprising:
a cross section image acquisition unit configured to acquire a cross section image generated by capturing an object with a probe;
an information acquisition unit configured to acquire information on a position and orientation of the probe capturing the object;
a three-dimensional image acquisition unit configured to acquire a three-dimensional image generated by capturing the object;
an error acquisition unit configured to acquire an error estimation value of measurement accuracy of the position and orientation of the probe;
a range determination unit configured to determine a range based on the information on the position and orientation of the probe and the error estimation value;
a generation unit configured to generate a display image from the three-dimensional image based on the range; and
a display control unit configured to display the display image on a display screen.

15. An image processing apparatus comprising:
a cross section image acquisition unit configured to acquire a cross section image generated by capturing an object with a probe;

an information acquisition unit configured to acquire information on a position and orientation of the probe capturing the object;

a three-dimensional image acquisition unit configured to acquire a three-dimensional image generated by capturing the object;

an error acquisition unit configured to acquire an error estimation value of measurement accuracy of the position and orientation of the probe;

a range determination unit configured to determine a range based on the information on the position and orientation of the probe and the error estimation value;

a generation unit configured to generate a display image from the three-dimensional image based on the range; and a display control unit configured to display the display image on a display screen.

16. The apparatus according to claim 15, wherein the generation unit is configured to generate, as the display image, cross section images of a plurality of cross sections parallel to a correspondence cross section of the cross section image in the three-dimensional image based on the range.

17. The apparatus according to claim 16, wherein the display control unit is configured to display, side by side, the cross section images on the display screen.

18. The apparatus according to claim 15, wherein the generation unit is configured to generate, as the display image, a projected image from the three-dimensional image based on the range.

19. The apparatus according to claim 15, wherein the error acquisition unit is configured to acquire the error estimation value based on information on acquisition progress of the position and orientation of the probe capturing the object.

20. The apparatus according to claim 16, wherein the display control unit is configured to display a list of the cross section images on the display screen.

21. The apparatus according to claim 15, wherein the cross section image is an ultrasonic image and the three-dimensional image is an MRI image or an X-ray CT image.

22. The apparatus according to claim 1, wherein the cross section image is an ultrasonic image and the three-dimensional image is an MRI image or an X-ray CT image.

* * * * *